United States Patent [19]

Kornilov et al.

[11] 4,187,181
[45] Feb. 5, 1980

[54] APPARATUS FOR CLASSIFYING LIQUID MIXTURE IN ACCORDANCE WITH MOLECULAR WEIGHT

[76] Inventors: Anatoly A. Kornilov, ulitsa Moskovskoe shosse, 45, kv. 78, Dolgoprudny; Viktor D. Petrushkin, 3 Novo-Ostankinskaya ulitsa, 23, kv. 49, Moscow; Viktor N. Stetsko, Stremyanny pereulok, 35, kv. 46, Moscow; Viktor M. Fridman, Karetny ryad, 5/10, kv. 180, Moscow, all of U.S.S.R.

[21] Appl. No.: 973,870

[22] Filed: Dec. 28, 1978

[51] Int. Cl.² ............................................. B01D 29/30
[52] U.S. Cl. .................................... 210/332; 210/336
[58] Field of Search .................. 210/323 T, 332, 335, 210/336, 446

[56] References Cited

U.S. PATENT DOCUMENTS

| | | | |
|---|---|---|---|
| 511,949 | 1/1894 | Hayes | 210/335 X |
| 1,000,405 | 8/1911 | Healy | 210/335 |
| 3,483,984 | 10/1969 | Wolkenhauer | 210/336 X |
| 3,710,946 | 1/1973 | Sawyer | 210/336 X |
| 4,096,062 | 6/1970 | Myreen et al. | 210/324 X |

*Primary Examiner*—John Adee
*Attorney, Agent, or Firm*—Lackenbach, Lilling & Siegel

[57] ABSTRACT

The apparatus comprises a plurality of tubular classifiers connected in series to one another and into sections which are parallel connected to a manifold to form a unit of the apparatus. Each tubular classifier has pipes for tangential admission of a liquid mixture and the removal of concentrate and filtrate, and vertically extending transverse partitions are provided immediately adjacent to end plates. The partitions have through holes arranged along a spiral line. The holes receive the ends of the tubular filtering elements and said ends are secured therein and the elements are arranged at an angle to the longitudinal axis of a casing and to the partitions.

2 Claims, 3 Drawing Figures

APPARATUS FOR CLASSIFYING LIQUID MIXTURE IN ACCORDANCE WITH MOLECULAR WEIGHT

FIELD OF THE ART

The present invention relates to an apparatus for classifying liquid mixture in accordance with molecular weight, e.g. for isolating silver salts from waste liquor in the photographic and film-making industries, and for concentrating of enzyme preparations, in chemical and allied industries.

The invention may be most efficiently used in processes of classification or for concentration of liquid mixtures in chemical, petrochemical and allied industries.

BACKGROUND OF THE INVENTION

At present classification of liquid mixtures in accordance with molecular weight is effected by means of commercial apparatus comprising a plurality of tubular classifiers connected in series to form sections which are parallel connected to a manifold and form a unit of the apparatus. Each tubular classifier comprises one tubular filtering element.

However, during operation of such apparatus, a precipitate is formed on the filtering surface of the tubular element during classification of liquid mixture. This results in a decrease in the efficiently of classification of the liquid mixture and a reduction of the throughput and/or output capacity of the apparatus, so that the apparatus should be stopped at regular intervals for cleaning of the filtering elements.

British patent specification No. 1256491 discloses an apparatus comprising a plurality of tubular classifiers connected in series to one another and which are formed into sections which are parallel connected to a manifold and form a unit of the apparatus. A hollows casing of each tubular classifier accommodates a plurality of filtering elements extending in parallel with the longitudinal axis of the tubular classifier and connected in series to one another. For removal of filtrate from the inner space of the tubular classifier, there is provided a pipe. End plates with pipes for admission of liquid mixture and removal of concentrate, respectively, are provided at the extremities of the hollow casing.

However, during the operation of the apparatus, a precipitate is deposited in the passages of the end plates interconnecting the series-connected tubular filtering elements. The precipitate is also deposited on the filtering surface of the filtering elements. The precipitates are formed as a result of laminary flow of the stream of liquid mixture in the tubular filtering elements.

The formation of precipitates lowers the efficiency of classification of a liquid mixture and reduces the throughput and/or output capacity of the apparatus. To remove the precipitate from the tubular filtering elements and passages of the end plates of the tubular classifiers, considerable time and skilled maintenance personnel are needed.

In view of the development and growth of a number of industries where it is required to classify liquid mixtures in accordance with molecular weight, and considering the great need to isolate valuable components from waste liquor, and in enriching starting products, the demand for such apparatus is constantly growing.

However, the prior art apparatus for classifying liquid mixture in accordance with molecular weight cannot comply with the evergrowing requirements as to efficiency and overall capacity.

Therefore, there is a long-felt need to improve the prior art apparatus for classifying liquid mixture in accordance with molecular weight, such as waste liquor containing silver salts, for concentration of enzyme preparations and classification of washing liquor containing soaps and fats.

SUMMARY OF THE INVENTION

It is the main object of the invention to provide an apparatus for classifying liquid mixture in accordance with molecular weight, which has a greater throughput and/or output capacity compared to prior art apparatus intended for the same purpose.

Another important object of the invention, is to prolong the service life of the apparatus.

An important object of the invention is to improve the efficiency of classification of liquid mixture.

These and other objects are accomplished by the provision of an apparatus for classifying liquid mixture in accordance with molecular weight, comprising a plurality of tubular classifiers connected in series to one another and into sections which are parallel connected to a manifold and form a unit of the apparatus. Each tubular classifier has a pipe for removal of filtrate, secured to a hollow casing accommodating tubular filtering elements, having their end portions secured in through holes provided in vertically extending transverse partitions arranged in the inner space of the tubular classifier at the end portions thereof immediately adjacent to the end plates. The tubular filtering elements are arranged at an angle to the longitudinal axis of the casing of the tubular classifier, and at an angle to the vertically extending transverse partitions in which said through holes are arranged along a spiral line conjugated with the longitudinal axis of a respective pipe tangentially connected to the end plate.

The inclined position of the tubular filtering elements in the tubular classifiers of the apparatus and the tangential connection of liquid mixture to be classified thereto enable the creation of turbulent flows of liquid in the tubular filtering elements, thus preventing the deposition of precipitate on the inner filtering surface of each of said tubular filtering elements.

The above-described construction of the apparatus results in an improved efficiency and prolonged service life thereof, hence, the throughput and/or output capacity of the apparatus is improved.

A conical projection is preferably provided in the apparatus for classifying liquid mixture in accordance with molecular weight, at least at one end plate, at the central portion from the inside, and a through hole is provided in the vertically extending transverse partition opposite to the conical projection, to receive the end of one of the tubular filtering elements.

The provision of the above-mentioned projection of the end plate enables the feeding of liquid stream to the central part of the tubular classifier, hence, an additional tubular filtering element may be arranged there.

The provision of a projection on the end plate on the liquid mixture inlet side is necessary, whereas it is optional on the side of outlet of the concentrate, since turbulence of flow in the tubular filtering elements of the next tubular classifier is ensured by their inclined position and the tangential connection of the pipe feeding liquid mixture to said next tubular classifier, which is also provided with a projection disposed on the inlet side of the end plate.

DESCRIPTION OF THE DRAWINGS

The invention will now be described in detail with reference to its embodiment illustrated in the accompanying drawings, in which.

DETAILED DESCRIPTION OF THE INVENTION

Figure 1:
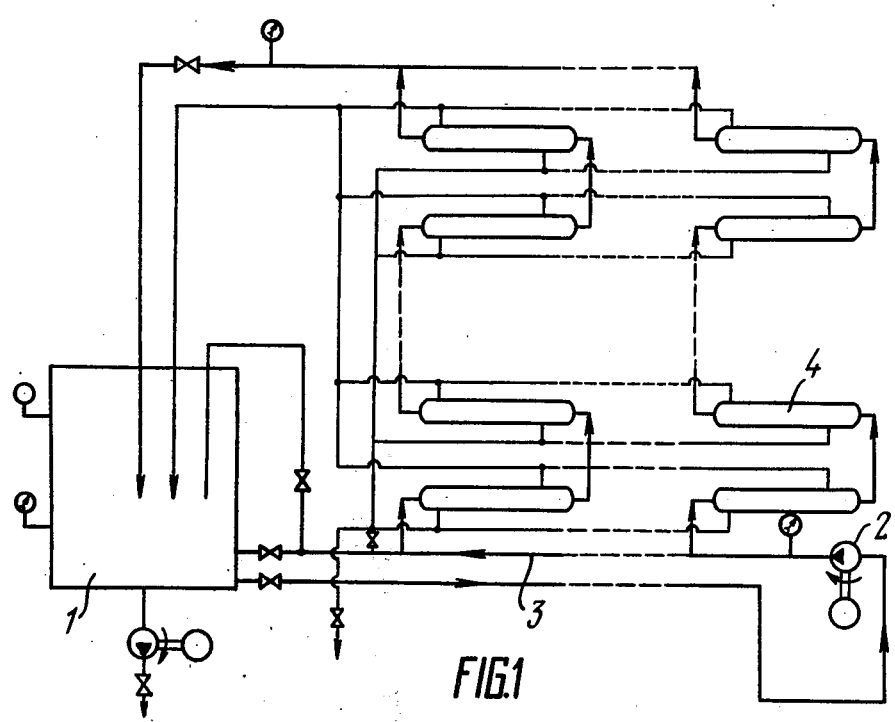
FIG. 1 is a schematic representation of an apparatus according to the invention.

An apparatus for classifying liquid mixture in accordance with molecular weight comprises a vessel 1 (FIG. 1) for liquid mixture to be separated, and a pump 2 is provided for feeding this mixture to a manifold 3 for distributing it among tubular classifiers 4 which are connected in series to one another and into sections. The sections are parallel connected to the manifold 3 and form a unit of the apparatus.

The drawing conventionally shows the extreme tubular classifiers of the end sections, and the intermediate tubular classifiers are not shown for the sake of simplicity, the links being shown with broken lines, Each tubular classifier 4 (FIG. 2) has a hollow casing 5 accommodating tubular filtering elements 6, and there is provided a pipe 7 for removal of filtrate. At the extremities of the tubular classifier 4 there are provided end plates 8 and 9 to which are tangentially connected pipes 10 and 11 for feeding liquid mixture and for removal concentrate, respectively.

The inner space 12 of the casing 5 of the tubular classifier 4, at the end portions thereof and immediately adjacent to the end plates 8 and 9, accommodates vertically extending transverse partitions 13 having through holes 14 in which the ends of the filtering elements 6 are inserted and secured so as to extend at an angle to the longitudinal axis of the hollow casing 5 of the tubular classifier and at an angle to the vertically extending transverse partitions 13.

Figure 2:
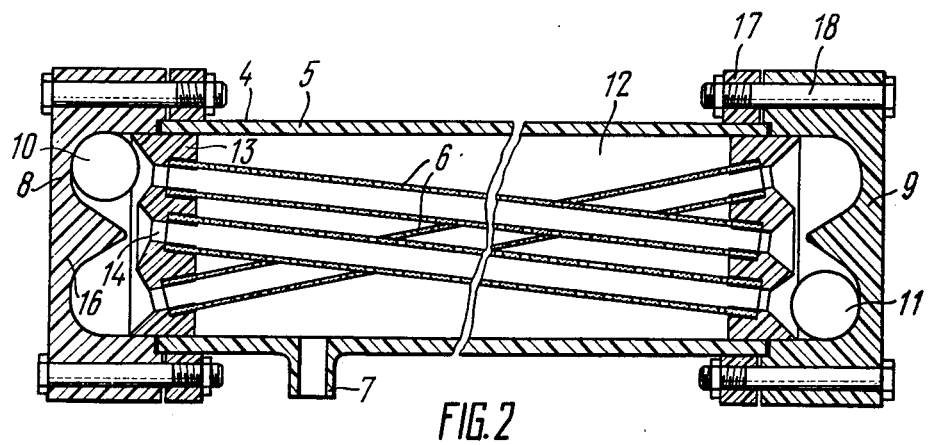
FIG. 2 is a partial longitudinal sectional view of one of the tubular classifiers of the apparatus.

The above-mentioned through holes 14 are arranged in each vertically extending transverse partition 13 along a spiral line 15 or 15' (FIG. 3) conjugated with the longitudinal axis of a respective pipe 10 or 11 tangentially connected to the end plate 8 or 9 (FIG. 2).

Figure 3:
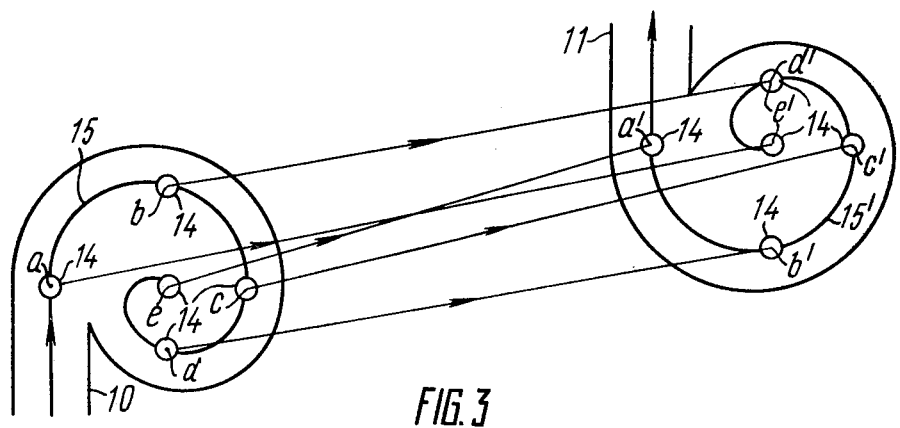
FIG. 3 is another schematic diagram illustrating: the arrangement of tubular filtering elements in the through holes arranged along a spiral line in vertically extending transverse partitions.

As shown in FIG. 3, the pipe 10 for feeding liquid mixture to the tubular classifier 4 (FIG. 2) is directed oppositely with respect to the pipe 11 (FIG. 3) for removal of the concentrate.

Accordingly, the spiral lines 15 and 15', along which the through holes 14 are made, are arranged respectively relative to the above-mentioned pipes 10 and 11, with the spiral line 15' associated with the pipe 11 being turned about the horizontal axes at 180° with respect to the spiral line 15 associated with the pipe 10. The arrow-lines show the direction of flow of the liquid mixture from the points (a,b,c,d,e) of the spiral line 15 towards the points (e',d',c',b',a') of the spiral line 15'. The ends of the respective tubular filtering elements 6 are conventionally disposed at these points (FIG. 2).

This arrangement of the ends of the tubular filtering elements 6 ensures an angular position thereof with respect to the longitudinal axis of the tubular classifier 4 and with respect to the vertical transverse partitions 13.

The end plate 8 is internally provided, at the central portion thereof, with a conical projection 16, and the vertically extending transverse partition 13 has a through hole 14 opposite thereto to receive the end of one of the tubular filtering elements 6. This projection may also be provided internally of the end plate 9, at the central portion thereof, adjacent to the pipe 11 for removal of the concentrate.

The end plates 8 and 9 are secured to flanges 17, at both ends of the hollow casing 5 of the tubular classifier 4, by means of bolts 18.

Such a construction of the apparatus facilitates assembly and disassembly.

The apparatus for classifying liquid mixture in accordance with molecular weight functions in the following manner.

Liquid mixture to be classified is fed from the vessel 1 (FIG. 1) by the pump 2 along a pipeline to the manifold 3 which distributes it among the tubular classifiers 4.

As the tubular classifiers 4 are connected in series to one another and into sections, the liquid mixture flows from one tubular classifier 4 into another and is gradually classified in each of them into a filtrate and a concentrate. The sections are parallel connected to the manifold 3 and form a unit of the apparatus as mentioned above.

The liquid mixture being classified is admitted through the pipe 10 (FIG. 2) which is tangentially connected to the end plate 8 to a chamber (space) between the end plate 8 and the vertically extending transverse partition 13, flows around the conical projection 16 and is distributed through the through holes 14 and among the tubular filtering elements 6.

The tubular filtering elements 6 are arranged at an angle to the longitudinal axis of the hollows casing 5 of the tubular classifier 4, and at an angle to the vertically extending transverse partitions 13 in which the ends of the tubular filtering elements are arranged along the spiral lines 15 and 15', so as to ensure turbulent flow of the streams of the liquid mixture.

The tangential admission of the liquid mixture through the pipe 10 ensures a combined rotary and translation motion of the liquid mixture in the chamber between the end plate 8 and the vertically extending transverse partition 13. This is greately facilitated by the provision of the conical projection 16 in the central part of the end plate 8 and a spiral groove in the vertically extending transverse partition 13 along which the through holes 14 communicating with the tubular filtering elements 6 are arranged.

As a result of a combined rotary and translation motion of the stream of the liquid mixture in each tubular filtering element 6, the contact of the liquid mixture being classified with the inner porous surface of the filtering element 6 is improved, and precipitate is not formed thereon. Filtrate passes through semipermeable membranes arranged on the inner surface of the tubular filtering elements 6 to the inner space of the tubular classifier 4 and is removed through the pipe 7. Concentrated part of the liquid mixture passes along the tubular filtering elements 6 and gets in the chamber between the vertically extending transverse partition and the end plate 9 at the pipe 11, through which it is tangentially discharged from the tubular classifier 4 to be admitted to the next tubular classifier 4 connected in series thereto.

Therefore, as a result of repeated combined rotary and translation motion of the liquid mixture in the tubular filtering elements 6 of the series-connected tubular classifiers 4, the concentrate is gradually separated from the filtrate, and the liquid mixture is classified in accordance with molecular weight.

Tests have shown that in the operation of the apparatus of the invention, there were no stagnation zones in the tubular classifiers, and no precipitate was deposited in the tubular filtering elements and in the chambers between the end plates and partitions.

The apparatus ensured an efficient classification in accordance with molecular weight of such liquid mixtures, as waste liquor containing silver salts as applied to the photographic and film-making industries, and concentration of enzyme preparations.

What is claimed is:

1. An apparatus for classifying liquid mixture in accordance with molecular weight, comprising:
   a plurality of tubular classifiers connected in series to one another and into a plurality of sections and each said section being parallel connected to a manifold to form a unit of said apparatus; each of said tubular classifiers having a hollow casing;
   end plates, each secured to a respective end of the hollow casing of each of said tubular classifiers; vertically extending transverse partitions, each arranged in the hollow casing of each of said tubular classifiers at the end portions thereof adjacent to said end plates; pipes for admission of liquid mixture, each pipe being tangentially connected to one of the end plates of a respective tubular classifier; pipes for removal of concentrate, each pipe being tangentially connected to the other end plate of said respective tubular classifier; said vertically extending transverse partitions having through holes arranged along a spiral line conjugated with the longitudinal axis of a respective tangentially connected pipe; tubular filtering elements, each having its ends secured in the through holes located at different levels in said vertically extending transverse partitions so that each tubular filtering element is arranged at an angle to the longitudinal axis of said tubular classifier and at an angle to said vertically extending transverse partitions; pipes for removal of filtrate and each pipe being connected to a hollow casing of a respective tubular classifier.

2. An apparatus for classifying liquid mixture in accordance with molecular weight according to claim 1, wherein at least one of said end plates is provided, at the central portion thereof, with a conical projection, and a through opening is made in said vertically extending transverse partition opposite thereto to receive the end of one of said tubular filtering element.

* * * * *